(12) United States Patent
Srinivasa et al.

(10) Patent No.: US 8,930,291 B1
(45) Date of Patent: Jan. 6, 2015

(54) CORTICAL NEUROMORPHIC NETWORK, SYSTEM AND METHOD

(71) Applicant: HRL Laboratories, LLC, Malibu, CA (US)

(72) Inventors: Narayan Srinivasa, Oak Park, CA (US); Jose Cruz-Albrecht, Oak Park, CA (US); Youngkwon Cho, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 207 days.

(21) Appl. No.: 13/708,823

(22) Filed: Dec. 7, 2012

Related U.S. Application Data

(60) Provisional application No. 61/642,021, filed on May 3, 2012.

(51) Int. Cl.
*G06N 3/06* (2006.01)
*G06N 3/04* (2006.01)
*G06N 3/02* (2006.01)

(52) U.S. Cl.
CPC .. *G06N 3/04* (2013.01); *G06N 3/06* (2013.01); *G06N 3/02* (2013.01)
USPC .................................. 706/15; 706/12; 706/45

(58) Field of Classification Search
None
See application file for complete search history.

(56) References Cited

U.S. PATENT DOCUMENTS 5,274,748 A   12/1993   Boser et al.

OTHER PUBLICATIONS

Tegner, et al., An adaptive spike-timing-dependent plasticity rule, Neurocomputing 44-46 (2002) pp. 189-194.*
Bailey et al., "Why VLSI implementation of associative VLCNs require connection multiplexing," in Proc. IEEE Int. Conf. Neural Netw., San Diego, CA, Jul. 1988, pp. 173-180.
Strukov et al., "Prospects for terabit-scale nanoelectronic memories," Nanotechnology, vol. 16, No. 1, pp. 137-148, 2005.
Jo et al., "Nanoscale memristor device as synapse in neuromorphic systems," Nano Lett., vol. 10, No. 4, pp. 1297-1301, 2010.
Gao et al., "Cortical models onto CMOL and CMOS architectures and performance/price," IEEE Trans. Circuits Syst. I, Reg. Papers, vol. 54, No. 11, pp. 2502-2515, Nov. 2007.
Partzsch et al., "Analyzing the scaling of connectivity in neuromorphic hardware and in models of neural networks," IEEE Trans. Neural Netw., vol. 22, No. 6, pp. 919-935, Jun. 2011.
Indiveri et al., "Neuromorphic silicon neuron circuits," Frontiers Neurosci., vol. 5, No. 73, pp. I-23, 2011.

(Continued)

*Primary Examiner* — Wilbert L Starks
(74) *Attorney, Agent, or Firm* — North Shore Associates

(57) ABSTRACT

A cortical neuromorphic network, system and method employ a plurality of neuromorphic nodes arranged in a network layer. The cortical neuromorphic network includes a neuromorphic node of the network layer in which the neuromorphic node includes a spike timing dependent plasticity (STDP) synapse and a neuromorphic neuron. The neuromorphic node is configured to receive a feedforward spike signal from selected ones of a plurality of input neurons of an input layer and to provide an output spike signal as a recurrent spike signal to the neuromorphic nodes of the network layer. A combination of the recurrent and feedforward spike signals is an excitatory spike signal of the neuromorphic node. The cortical neuromorphic system includes the neuromorphic nodes configured to operate according to a cycle and time slots of synaptic time multiplexing. The method includes receiving and weighting the excitatory spike signal using the STDP synapse and producing the output spike signal.

21 Claims, 5 Drawing Sheets

(56) References Cited

OTHER PUBLICATIONS

Srinivasa et al., "Analog learning systems of neuromorphic adaptive plastic scalable electronics," IEEE Pulse, vol. 3, No. 1, pp. 51-56, Jan.-Feb. 2012.
Markram et al., "Regulation of synapticefficacy by coincidence of postsynaptic APs and EPSPs," Sci. Mag., vol. 2, vol. 75, pp. 213-215, 1997.
Bi et al., "Activity-induced synaptic modifications in hippocampal culture: Dependence on spike timing, synaptic strength and cell type," J. Neurosci. vol. 18, No. 24, pp. 10464-10472, 1998.
Izhikevich, "Polychronization: Computation with spikes," Neural Comput., vol. 18, No. 2, pp. 245-282, 2006.
Izhikevich et al., "Spike-timing Dynamics of Neuronal Groups," Cerebral Cortex, vol. 14, No. 8, pp. 933-944, 2004.
Vogels et al, "Neural network dynamics," Annu. Rev. Neurosci., vol. 28, pp. 357-376, Jul. 2005.
Chen et al., "Real-time simulation of biologically realistic stochastic, neurons in VLSI," IEEE Trans. Neural Netw., vol. 21, No. 9, pp. 1511-1517, Sep. 2010.
Sharma et al., "Accelerating FPGA routing using architecture-adaptive A* techniques," in Proc. IEEE Int. Field-Program. Technol. Conf., Dec. 2005, pp. 225-232.
Kim et al., "A functional hybrid memristor crossbar-array/cmos system for data storage and neuromorphic applications," Nano Lett., vol. 12, No. 1, pp. 389-395, 2012.
Wheeler et al., "CMOS integrated memristors for neuromorphic architectures," in Proc. Int. Semicond. Device Res. Symp., Dec. 2011, pp. 1-2.
Merolla et al., "Expandable networks for neuromorphic chips," IEEE Trans. Circuits Syst. I, vol. 54, No. 2, pp. 301-311, Feb. 2007.
Khan et al, "SpiNNaker: Mapping neural networks onto a massively-parallel chip multiprocessor," in Proc. IEEE Int. Joint Conf. Neural Netw. World Congr. Comput. Intell., Jun. 2008, pp. 2849-2856.
Schemmel et al., "Implementing synaptic plasticity in a VLSI spiking neural network model," in Proc. Int. Joint Conf. Neural Netw., 2006, pp. 1-6.
Schemmel et al., "A wafer-scale neuromorphic hardware system for large-scale neural modeling," in Proc. IEEE Int. Symp. Circuits Syst., May-Jun. 2010, pp. 1947-1950.
Serrano-Gotarredona et al., "Caviar: A 45k neuron, 5M synapse, 12G connects/s AER hardware sensory-processing-learning-actuating system for high-speed visual object recognition and tracking," IEEE Trans. Neural Netw., vol. 20, No. 9, pp. 1417-1438, Sep. 2009.
Indiveri et al., "Frontiers in neuromorphic engineering," Frontiers Neurosci., vol. 5, No. 118, pp. 1-2, 2011. [27] M. Mahowald, "VLSI analogs of neuronal visual processing: A synthesis of form and function," Ph.D. dissertation, Dept. Comput. Neural Syst., California Inst. Technol., Pasadena, 1992.
Boahen, "A burst-mode word-serial address-event link-I: Transmitter design," IEEE Trans. Circuits Syst. I, vol. 51, No. 7, pp. 1269-1280, Jul. 2004.
Boahen, "A burst-mode word-serial address-event link-II: Receiver design," IEEE Trans. Circuits Syst. I, vol. 51, No. 7, pp. 1281-1291, Jul. 2004.
Boahen, "Point-to-point connectivity between neuromorphic chips using address events," IEEE Trans. Circuits Syst. II, vol. 47, No. 5, pp. 416-434, May 2000.
Indiveri et al., "A reconfigurable neuromorphic VLSI multichip system applied to visual motion computation," in Proc. 7th Int. Conf. Microelectron. Neural, Fuzzy Bio-Inspired Syst., 1999, pp. 37-44.

Luu et al., "VPR 5.0: FPGA cad and architecture exploration tools with singledriver routing, heterogeneity and process scaling," in Proc. ACM/SIGDA Int. Symp. Field Program. Gate Arrays, 2009, pp. 1-10.
Viswanathan et al., "FastPlace 3.0: A fast multilevel quadratic placement algorithm with placement congestion control," in Proc. Asia South Pacific Design Autom. Conf., Jan. 2007, pp. 135-140.
Padmini et al., "Architecture-aware FPGA placement using metric embedding," in Proc. 43rd Annu. Design Autom. Conf., 2006, pp. 1-6.
Dehon, "Balancing interconnect and computation in a reconfigurable computing array," in Proc. ACM/SIGDA 7th Int. Symp. Field Program. Gate Arrays, 1999, pp. 1-10.
Achard et al., "A resilient, low-frequency, small-world human brain functional network with highly connected association cortical hubs," J. Neurosci., vol. 26, pp. 63-72, Jan. 2006.
Dongarra et al., "A sparse matrix library in C++ for high performance architectures," in Proc. 2nd Object Oriented Numerics Conf., 1994, pp. 214-218.
Ren et al., "Diffusion-based placement migration," in Proc. 42nd Annu. Design Autom. Conf., 2005, pp. 1-6.
Hart et al., "A formal basis for the heuristic determination of minimum cost paths," IEEE Trans. Syst. Sci. Cybern., vol. 4, No. 2, pp. 100-107, Jul. 1968.
Huffman, "A method for the construction of minimum-redundancy codes," Proc. IRE, vol. 40, No. 9, pp. 1098-1102, Sep. 1952.
Welch, "A technique for high-performance data compression," IEEE Comput., vol. 17, No. 6, pp. 8-19, Jun. 1984.
Hodgkin et al., "A quantitative description of membrane current and application to conduction and excitation in nerve," J. Phys., vol. 117, No. 4, pp. 500-544, 1952.
Izhikevich, "Which model to use for cortical spiking neurons?" IEEE Trans. Neural Netw., vol. 15, No. 5, pp. 1060-1070, Sep. 2004.
Fitzhugh, "Impulses and physiological states in theoretical models of nerve membrane," Biophys. J., vol. 1, No. 6, pp. 445-466, 1961.
Brette et al., "Adaptive exponential integrate and fire model as an effective description of neuronal activity," J. Neurphys., vol. 94, No. 5, pp. 3637-3642, 2005.
Bartolozzi et al., "Synaptic dynamics in analog VLSI," Neural Comput., vol. 19, No. 10, pp. 2581-2603, 2007.
Turrigiano et al., "Homeostatic plasticity in the developing nervous system," Nature Rev. Neurosci., vol. 5, No. 2, pp. 97-107, 2004.
Song et al., "Competitive Hebbian Learning Through Spike-Timing Dependent Synaptic Plasticity," Nature Neuroscience, vol. 3, 2000, pp. 919-926.
Fuhrmann et al., "Spike frequency adaptation and neocortical rhythms," J. Neurophys., vol. 88, No. 2, pp. 761-770, 2002.
Boegerhausen et al., "Modeling short-term synaptic depression in silicon," Neural Comput., vol. 15, No. 2, pp. 331-348, 2003.
Wu et al., "Contribution of AMPA, NMDA, and GABA(A) receptors to temporal pattern of postsynaptic responses in the inferior colliculus of the rat," J. Neurosci., vol. 24, No. 19, pp. 4625-4634, 2004.
Hynna et al., "Neuronal ion-channel dynamics in silicon," in Proc. IEEE Circuits Syst. ISCAS Int. Symp., May 2006, pp. 3614-3617.
McMurchie et al., "PathFinder: A negotiation-based performance-driven router for FPGAs," in Proc. 3rd Int. ACM Symp. Field Program. Arrays, 1995, pp. 111-117.
Hines et al., "Neuron: A tool for neuroscientists," Neuroscientist, vol. 7, No. 2, pp. 123-135, 2001.
Minkovich et al., "Programming Time-Multiplexed Reconfigurable Hardware Using a Scalable Neuromorphic Compiler," IEEE Trans. on Neural Networks and Learning Systems, vol. 23, No. 6, Jun. 2012, pp. 889-910.

* cited by examiner

CORTICAL NEUROMORPHIC NETWORK, SYSTEM AND METHOD

CROSS-REFERENCE TO RELATED APPLICATIONS

This application claims priority from U.S. Provisional Patent Application Ser. No. 61/642,021, filed May 3, 2012, the entire contents of which is incorporated herein by reference.

STATEMENT REGARDING FEDERALLY SPONSORED RESEARCH OR DEVELOPMENT

This invention was made with Government support under Contract No. HRL 0011-09-C-0001 awarded by DARPA. The Government has certain rights in the invention.

BACKGROUND

1. Technical Field

The invention relates to analog circuits, systems and related signal processing. In particular, the invention relates to elements and processing used in synapses of biologically inspired neuromorphic circuits and systems.

2. Description of Related Art

Complex, real-time and near real-time processing and control applications are becoming more commonplace and important. Examples include, but are not limited to, real-time image processing, as well as processing data, from a large array of sensors (e.g., a focal plane array of optical sensors) that may involve simultaneous processing of multiple, parallel channels from the sensor array. Such real-time processing often presents significant design challenges including, but not limited to, providing implementations that have sufficient processing power and at the same time exhibit reasonable energy efficiency. Neuromorphic circuits and related circuit topologies may offer a solution to some of these significant obstacles associated with the design and implementation of real-time processing and control.

Neuromorphic circuits are electronic circuits that mimic the operation of cell populations within a nervous system and as such, may offer a number of advantages for robust signal processing in support of various real-time control and sensor processing applications. In particular, neuromorphic circuits may facilitate robust signal processing in a manner that mimics certain populations of neural cells including, but not limited to, populations of neural cells found in the brain of an animal, for example. As an animal's brain is generally adept at processing and interpreting a barrage of signals received from an animal's environment in a robust and energy efficient manner, so too are various neuromorphic circuits that mimic brain-like functions. Specifically, the neuromorphic circuit may perform various brain-like functions in a manner substantially similar to, or at least modeled on, its biological counterpart. However, the challenge remains to develop practical implementations of neuromorphic circuits and more particularly, low-power integrated circuit implementations thereof, that can be applied to real-time control and processing systems.

BRIEF SUMMARY

In some embodiments, a cortical neuromorphic network is provided. The cortical neuromorphic network comprises a neuromorphic node comprising a spike timing dependent plasticity (STDP) synapse and a neuromorphic neuron. The neuromorphic node is a node of a plurality of neuromorphic nodes arranged as a network layer to receive a feedforward spike signal from selected ones of a plurality of input neurons of an input layer and to provide a neuromorphic node output spike signal as a recurrent spike signal to the neuromorphic nodes of the network layer. A combination of the recurrent spike signal from the neuromorphic nodes of the network layer and the feedforward spike signal received from the selected ones of the input layer input neurons is an excitatory spike signal of the neuromorphic node.

In some embodiments, a synaptic time multiplexing cortical neuromorphic system is provided. The synaptic time multiplexing cortical neuromorphic system comprises a plurality of neuromorphic nodes arranged as a network layer to receive excitatory spike signals representing a combination of recurrent spike signals and feedforward spike signals. The recurrent spike signals are derived from output spike signals produced by the neuromorphic nodes in the network layer. The feedforward spike signals represent output spike signals from a plurality of input neurons of an input layer. The neuromorphic node comprises a spike timing dependent plasticity (STDP) synapse, a neuromorphic neuron and a synaptic memory associated with STDP synapse. The neuromorphic nodes are configured to operate according to a cycle and time slots of synaptic time multiplexing (STM).

In some embodiments, a method of neuromorphic cortical operation is provided. The method of neuromorphic cortical operation comprises receiving an excitatory spike signal using a neuromorphic node that comprises a spike timing dependent plasticity (STDP) synapse and a neuromorphic neuron. The neuromorphic node is a node of a plurality of neuromorphic nodes arranged as a network layer. The method of neuromorphic cortical operation further comprises weighting the received excitatory spike signal according to an STDP synaptic conductance of the STDP synapse. The method of neuromorphic cortical operation further comprises producing an output spike signal by processing the weighted excitatory spike signal using the neuromorphic neuron. The output spike signal is a recurrent spike signal of the neuromorphic node. The excitatory spike signal comprises a combination of the recurrent spike signals from the neuromorphic nodes of the network layer and feedforward spike signals received from selected ones of a plurality of input neurons of an input layer.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Certain embodiments have other features that are one of in addition to and in lieu of the features illustrated in the above-referenced figures. These and other features are detailed below with reference to the above-referenced figures.

DETAILED DESCRIPTION

Embodiments consistent with the principles of the present invention provide a cortical neuromorphic network. In particular, embodiments in accordance with the principles described herein may implement one or both of a cortical column and a cortical map using the cortical neuromorphic network. In some embodiments, the cortical neuromorphic network and systems that employ the same according to the principles described herein may yield neuromorphic constructs which are highly scalable while simultaneously being practical to implement using available circuit technology.

According to some examples and embodiments, synaptic time multiplexing may be employed in conjunction with the cortical neuromorphic network to implement a fully connected neural network by time multiplexing physical connections within the cortical neuromorphic network. In particular, 'synaptic time multiplexing,' as defined and employed herein, divides or breaks down the fully connected neural network into a plurality of decoupled sub-networks. The plurality of decoupled sub-networks comprises all of the nodes of the fully connected neural network. However, each of the decoupled sub-networks comprises only a subset of a set of connections between nodes that is represented by the fully connected neural network. Synaptic time multiplexing further forms the fully connected neural network as a time series of the various decoupled sub-networks. In particular, synaptic time multiplexing forms the decoupled sub-networks in different time slots of a synaptic time multiplexing cycle. In some embodiments, each of the decoupled sub-networks is formed in the different time slots. When the synaptic time multiplexing cycle is completed, all of the decoupled sub-networks have been formed. Moreover, when combined over a period of the synaptic time multiplexing cycle, the decoupled sub-networks and their respective subsets of connections produce the fully connected neural network.

Figure 1A:
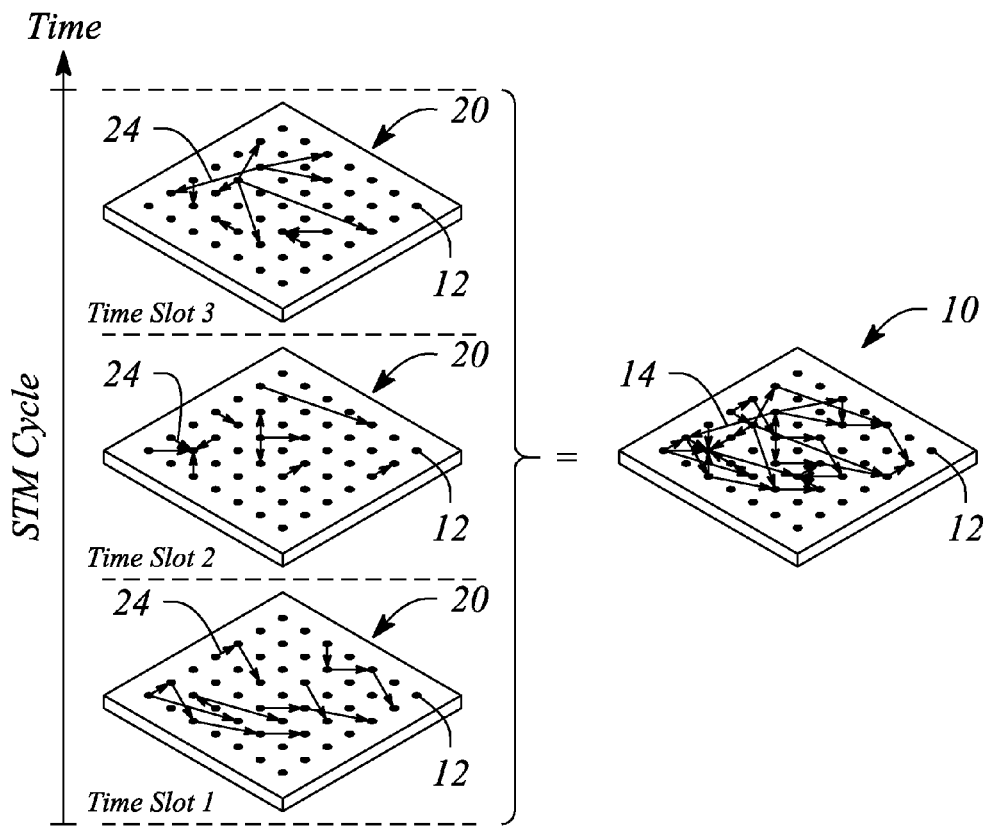
FIG. 1A illustrates a schematic representation of synaptic time multiplexing, according to an embodiment consistent with the principles of the present invention.

FIG. 1A illustrates a schematic representation of synaptic time multiplexing, according to an embodiment consistent with the principles of the present invention. In particular, a right side of FIG. 1A illustrates a fully connected neural network 10 in terms of nodes 12 and connections 14 between nodes. A left side of FIG. 1A illustrates three decoupled sub-networks 20, by way of example. A sub-network 20 comprises the nodes 12 of the fully connected neural network. Further, the sub-network 20 comprises a subset of the connections 24 in the fully connected neural network 10. For example, the respective subset of the connections 24 may be different for each sub-network 20. Combined, the connections 24 of the subsets equal the set of the connections 14 of the fully connected neural network 10 as indicated by an equal sign ('=') in FIG. 1A. Moreover, the subsets of the connections 24 illustrated in FIG. 1A may be executed or otherwise formed during separate time slots of a synaptic time multiplexing cycle (e.g., time slots 1, 2 and 3, as illustrated). When combined or summed together, the subsets of connections 24 formed during the separate time slots produce all of the connections 14 of the fully connected neural network 10. As such, once every synaptic time multiplexing cycle, the fully connected neural network 10 may be realized by the sequential formation of the subsets of connections 24 represented by the decoupled sub-networks 20.

Figure 1B:
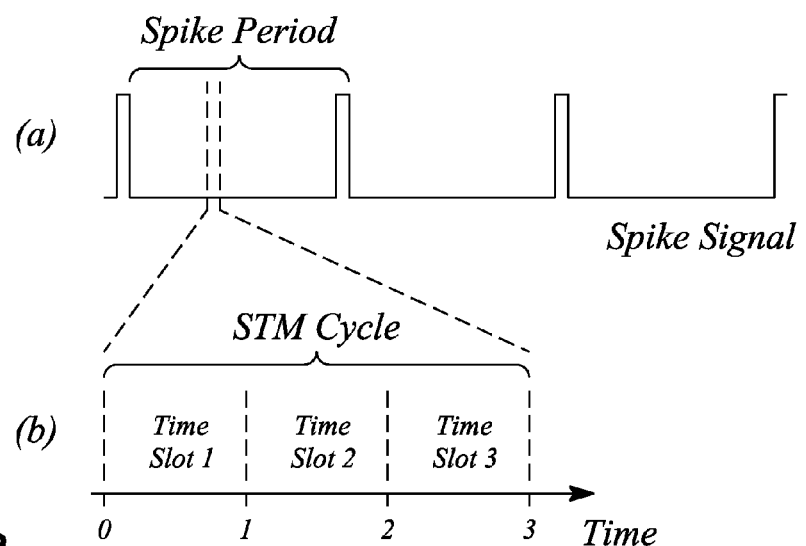
FIG. 1B illustrates a graphical representation of a synaptic time multiplexing cycle, according to an embodiment consistent with the principles of the present invention.

FIG. 1B illustrates a graphical representation of a synaptic time multiplexing cycle, according to an embodiment consistent with the principles of the present invention. Also illustrated is a plot of an example spike signal. In particular, an upper portion of FIG. 1B labeled (a) illustrates the spike signal having a spike period, and a lower portion of FIG. 1B labeled (b) illustrates a synaptic time multiplexing cycle of the spike period. The synaptic time multiplexing cycle includes three time slots, as illustrated by way of example. The three time slots may be the time slots during which the decoupled sub-networks 20 of FIG. 1A are formed, for example. During a first time slot (e.g., time slot 1) of FIG. 1B, a first decoupled sub-network 20 (or e.g., connections 24 thereof) may be formed. Then, during a second time slot (e.g., time slot 2) and a third time slot (e.g., time slot 3) of FIG. 1B, a second decoupled sub-network 20 and third decoupled sub-network 20, respectively, (or e.g., connections 24 of each thereof) in FIG. 1A may be formed, for example. At an end of the synaptic time multiplexing cycle, all of the decoupled sub-networks, and by extension all of the subsets of connections 24, have been formed such that all of the connections 14 of the fully connected neural network 10 have been formed. Further, the synaptic time multiplexing cycle is a fraction of the spike period of the spike signal, as illustrated in FIG. 1B. According to various examples, the synaptic time multiplexing cycle may be repeated in each spike period and is timed to be completed during a spike of the spike signal. Further discussion of synaptic time multiplexing is provided by Minkovich et al., "Programming Time-Multiplexed Reconfigurable Hardware Using a Scalable Neuromorphic Compiler," *IEEE Trans. on Neural Networks and Learning Systems*, Vol. 23, No. 6, June 2012, pp. 889-910, incorporated herein by reference in its entirety. Synaptic time multiplexing is also described in more detail in a co-pending patent application "Synaptic Time Multiplexing" Ser. No. 13/535,114 filed Jun. 27, 2012 to Cruz-Albrecht et al., incorporated herein by reference. According to various examples, circuits and systems that employ synaptic time multiplexing may transmit signals within and among elements of the circuits and systems as spike signals.

Herein, a 'signal' is defined as a time varying quantity. Thus, a signal may be generally represented by a function of time t as S(t). However, in general herein, signals are represented without explicit reference to time for simplicity of notation and not by way of limitation. For example, the signal S(t) may be denoted or represented simply as 'S'. Herein, a 'spike signal', also referred to as an action potential, is defined herein as a signal that comprises two states as a function of time (t). According to some embodiments, a first state of the two states is referred to as a low or 'OFF' state and a second state of the two states is referred to as a high or 'ON' state. In various examples, the states may represent one or both of voltage or current values or levels. For example, the first state may be a first voltage (e.g., 0 millivolts (mV)) and the second state may be second voltage (e.g., 1 mV). Alternatively, the states may be represented by values of current such that the first state is a first current (e.g., 0 microamps (µA)) and the second state is a second current (e.g., 10 µA). A spike signal in which the states are represented as voltage values may be referred as a 'voltage' spike signal. Also, a spike signal in which values of current represent the states may be referred to as a 'current' spike signal.

Further, a spike signal is generally characterized by being in or exhibiting one of the two states (e.g., the first or OFF state) for a majority of the time t with only brief transitions to the other state (e.g., the second or ON state), by definition herein. For example, the spike signal may exhibit a sequence of spikes of the ON state that are separated by relatively longer periods or inter-spike intervals (i.e., relative to a length of the spike) of the OFF state. According to various examples, a ratio of a length in time of a spike or 'spike time' to a length in time of an inter-spike interval or 'inter-spike interval time' is generally much less than one. In some embodiments, the ratio may be less than about 0.2. In some embodiments, the ratio is generally less than about 0.1 and may even be less than about 0.05. For example, the OFF state inter-spike interval time may be about 10 seconds (s) while the spike time of the ON state may have a length of about 1 s, for example. In another example, the ON state spike time may be about 0.1 s, while the OFF state inter-spike interval time between a pair of ON state spikes may be between about 1 s and about 10 s or more.

According to various examples, the spikes of the spike signal may be either aperiodic or periodic. For example, an aperiodic spike signal may comprise a series of spikes that occur at substantially random times or have substantially random inter-spike intervals. On the other hand, the spike signal may be a periodic spike signal that exhibits spikes at regular and repeating points in time. For example, a periodic spike signal may have a spike every 10 s. In another example, spikes may occur at intervals of about 5 s in another periodic spike signal. Such periodic spike signals are often said to have or exhibit a duty cycle. Herein, 'duty cycle' is defined in the usual sense as a ratio of a length of a spike to a time interval between spikes in a periodic spike signal.

Further, a periodic spike signal may be piece-wise periodic or quasi-periodic as used herein. In particular, the periodic spike signal may be periodic for only a finite and relatively short period of time. For example, a periodic spike signal may comprise a sequence of five or ten spikes in a periodic sequence. In another example, a periodic spike signal may comprise a finite sequence of periodic spikes (e.g., 5 spikes) followed by a relatively long interval of no spikes that may be further followed by another finite sequence of periodic spikes. The other finite sequence of periodic spikes may have the same number (e.g., 5) or a different number (e.g., 1, 2, 3, 4, 6, 7, 8, . . . ) of spikes, for example. In other embodiments, a duty cycle, or equivalently an inter-spike interval, of spikes of a periodic spike signal may vary as a function of time.

In some embodiments, spikes of a spike signal (either aperiodic or periodic) may occur asynchronously. By 'asynchronously' it is meant by definition that timing of a spike in the spike signal is not determined or otherwise tied to a particular clock signal. In particular, spikes of a pair of spike signals may be asynchronous with respect to one another. Timing of the spikes in the pair of asynchronous spike signals is or may be substantially uncorrelated between the pair. As such, spikes of a first spike signal of the pair may occur at any time relative to spikes of a second spike signal of the pair since the pair of spike signals are not tied to or otherwise regulated by a master clock signal.

Herein, 'scaling' a signal is defined as multiplying the signal by a scalar value. Scaling generally affects a magnitude of the signal, by definition herein. For example, scaling a signal S by an arbitrary value P, with P being a scalar value, is equivalent to forming a multiplicative product P·S. Scaling may be provided by a gain block, according to some examples.

An amplifier with a specified gain or gain value g is an example of a gain block that may provide signal scaling. The gain g of the amplifier is applied by the amplifier to an amplitude of an input signal $S_{in}$ at an input of the amplifier to produce an output signal $S_{out}$ where the output signal $S_{out}$ equals the multiplicative product g times $S_{in}$ (e.g., $S_{out}$=g·$S_{in}$). In general, the amplifier gain g may be positive or negative. An amplifier having negative gain is simply an amplifier having a gain value g that is less than zero (i.e., -g where g is a positive integer), by definition herein.

Further herein, the terms 'gate' and 'gating' are employed and defined in the conventional sense with respect to an analog signal. In particular, a gate is a circuit or related structure that allows the analog signal to pass when the gate is enabled and substantially blocks passage of the analog signal when the gate is not enabled. A switch is an example of a gate that may be used for gating an analog signal.

Herein, 'spike timing dependent plasticity (STDP)' is defined as a characteristic that is observed in synapses in the brain generally involving an adjustment of strength of a connection or 'synapse' between a pair of neurons. The adjustment may be defined by an STDP learning rule that establishes a variation in a synaptic conductance or weight w, based on a time difference (both positive and negative) or relative timing of input and output action potentials (i.e., spikes) at the synapse. The STDP learning rule relates a change Δw in the synaptic conductance of a synapse that connects a pair of neurons to a timing difference ($\Delta t_{i,j}=t_i^{pre}-t_j^{post}$) between the output action potential of a pre-synaptic neuron ($t_i^{pre}$) and the input action potential of a post-synaptic neuron ($t_j^{post}$) In particular, as defined by the STDP learning rule, the synaptic conductance w undergoes depression according to an exponential decay of the right half of the STDP learning rule when the timing difference $\Delta t_{i,j}$ is positive. Alternatively, in response to a negative timing difference $\Delta t_{i,j}$, the synaptic conductance w undergoes potentiation according to an exponential decay of the left half of the STDP learning rule. The change or adjustment of the synaptic conductance w provided by the STDP learning rule may substantially mimic observed changes in the synaptic conductance w associated with synapses between neurons in the brain, according to some embodiments.

Figure 2:
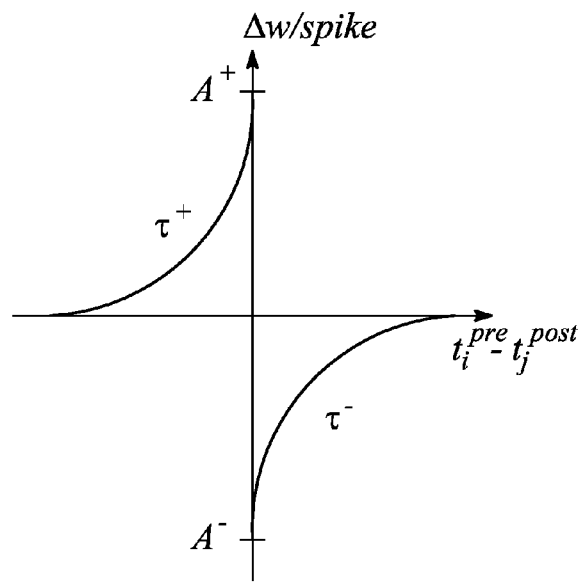
FIG. 2 illustrates a graph of a spike timing dependent plasticity (STDP) learning rule, according to an example consistent with the principles described herein.

FIG. 2 illustrates a graph of a spike timing dependent plasticity (STDP) learning rule, according to an example consistent with the principles described herein. As illustrated in FIG. 2, the STDP learning rule or curve has four parameters $A^+$, $A^-$, $\tau^+$ and $\tau^-$ that control a shape of the of the STDP learning curve. The first two parameters, a positive amplitude $A^+$ and a negative amplitude $A^-$, control a maximum change in the synaptic conductance Δw associated respectively with potentiation and depression of the synapse response. Time decay constants $\tau^+$ and $\tau^-$ of the STDP learning curve set a decay rate for potentiation and depression, respectively. A further discussion of the STDP learning rule may be found, for example, in Song et al., "Competitive Hebbian Learning Through Spike-Timing Dependent Synaptic Plasticity," *Nature Neuroscience*, Vol. 3, 2000, pp. 919-926, incorporated herein by reference.

According to various examples, the 'neuromorphic neuron', by definition herein, is a neuromorphic construct that mimics or emulates the neuro-biological characteristics of a biological neuron. In various examples, the neuron may comprise any of a number of neuromorphic constructs including, but not limited to, a complimentary metal oxide semiconductor (CMOS) neuron circuit and a memristor-based neuron circuit. In other embodiments, the neuron may be a software-based neuron or a firmware-based neuron that, in whole or in part, employs a software or firmware simulation of the neuro-biological characteristics of the biological neuron. For example, the neuron may be implemented based on a leaky integrate and fire neuron model that comprises a leaky integrator and is compatible with spike signals. Any of a variety of other neuron implementations including, but not limited to, a Hodgkin-Huxley neuron, Izhikevich neuron, and a current or conductance integrate-and-fire (e.g., an adaptive exponential integrate and fire model) neuron may be employed as the neuron herein, according to various examples. Further example neuron implementations may be found, for example, in FIG. 2 of E. M. Izhikevich, "Which Model to Use for Cortical Spiking Neurons?," *IEEE Transactions on Neural Networks*, 15:1063-1070, 2004, incorporated by reference herein in its entirety.

According to various examples, the 'synapse', by definition herein, comprises a neuromorphic construct that mimics or emulates the neuro-biological characteristics of a biological synapse. In various examples, the synapse may comprise any of a number of neuromorphic constructs including, but not limited to, synapses based on CMOS circuitry. For example, the synapse may comprise CMOS circuitry and a learning module. The learning module may implement any of several different types of synaptic plasticity rules including, but not limited to, Hebbian plasticity, spike timing-dependent plasticity and short-term plasticity. In other embodiments, the synapse may be a software-based or a firmware-based synapse that, in whole or in part, employs a software simulation or a firmware simulation of the neuro-biological characteristics of the biological synapse (e.g., to implement one or both of synapse circuitry and the learning module). In a basic form, the synapse provides an interface between neurons. For example, the interface may merely translate signals from a received form to a form that is compatible with the neuron.

For example, the learning module of the synapse may be implemented as one or more of hardware, software and firmware, which implements a synaptic spike timing dependent plasticity (STDP) learning rule. Such a synapse may be referred to as an STDP synapse. In some embodiments, the STDP synapse comprises a synapse core. The synapse core is configured to receive a pre-synaptic spike signal and to produce a weighted spike signal. In some embodiments, a pre-synaptic spike signal received by the synapse core is the pre-synaptic signal $V_{pre}$ provided by a pre-synaptic neuron (e.g., a neuron of a node 12). According to various examples, the weighted spike signal that is produced by the synapse core is weighted in accordance with a weight signal W(t) that is based on the STDP learning rule.

Examples consistent with the principles described herein may be implemented using a variety of devices including, but not limited to, integrated circuits (ICs), very large scale integrated (VLSI) circuits, application specific integrated circuits (ASIC), software, firmware or a combination of two or more of the above. For example, elements or 'blocks' of an apparatus consistent with the principles described herein may all be implemented as circuit elements within an ASIC or a VLSI circuit. In another example, the entire apparatus may be implemented as software using a computer programming language (e.g., C/C++) or software-based modeling environment (e.g., Matlab). In yet another example, some of the blocks may be implemented using actual circuitry (e.g., as an IC or an ASIC) while other blocks may be implemented in software or firmware.

Herein, a 'cortical map' and a 'cortical column' are defined as a collection of nodes in a neuromorphic network identified with performance of a specific information processing function. Both of a cortical map and a cortical column may be developed or induced in a general-purpose neuromorphic network through competition among the nodes during training of the neuromorphic network, for example. The competition may be STDP-induced competition, for example. Further herein, cortical column may be induced by a winner-takes-all competition that strongly selects for a particular or select set of inputs (e.g., input neurons or feedforward connections) to the neuromorphic network. In particular, a combination of feedforward synapses (e.g., connected to the input neurons) and recurrent synapses (e.g., connected to outputs of the nodes) may gradually train initially non-selective nodes to be selective for the select set of inputs. A shorter latency of feedforward connections compared to recurrent connections within the neuromorphic network may facilitate training in which feedforward synapses associated with the select set of inputs eventually dominate the recurrent synapse of the neuromorphic network, for example.

The presence of an inhibitory feedback path or connection within the neuromorphic network may lead to development of a cortical map, as opposed to a cortical column, in some embodiments. The inhibitory feedback may be provided to an inhibition input of the nodes and may be controlled by inhibitory inhibition interneuron gain, for example. In particular, opposing stimulation of the excitatory inputs and the inhibition inputs of neurons of the nodes due to the presence of the inhibitory feedback may lead to smoothly changing cortical maps that may tend to match patterns embedded in the synaptic conductances of local excitatory connections that are amplified while outliers are suppressed due to action of the inhibitory feedback. Matching patterns tends to drive or move the neuromorphic network towards a fundamental activity distribution that reflects the map of its excitatory connections. As a result, an activity distribution of the neuromorphic network manifests into a synaptic conductance map having a smoothly changing topology that emerges due to the spiking interactions between nodes in the neuromorphic network, according to some embodiments.

Further, as used herein, the article 'a' is intended to have its ordinary meaning in the patent arts, namely 'one or more'. For example, 'a signal' means one or more signals and as such, 'the signal' means 'the signal(s)' herein. Also, any reference herein to 'top', 'bottom', 'upper', 'lower', 'up', 'down', 'front', back', 'left', 'right' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Moreover, examples and embodiments herein are intended to be illustrative only and are presented for discussion purposes and not by way of limitation.

Figure 3A:
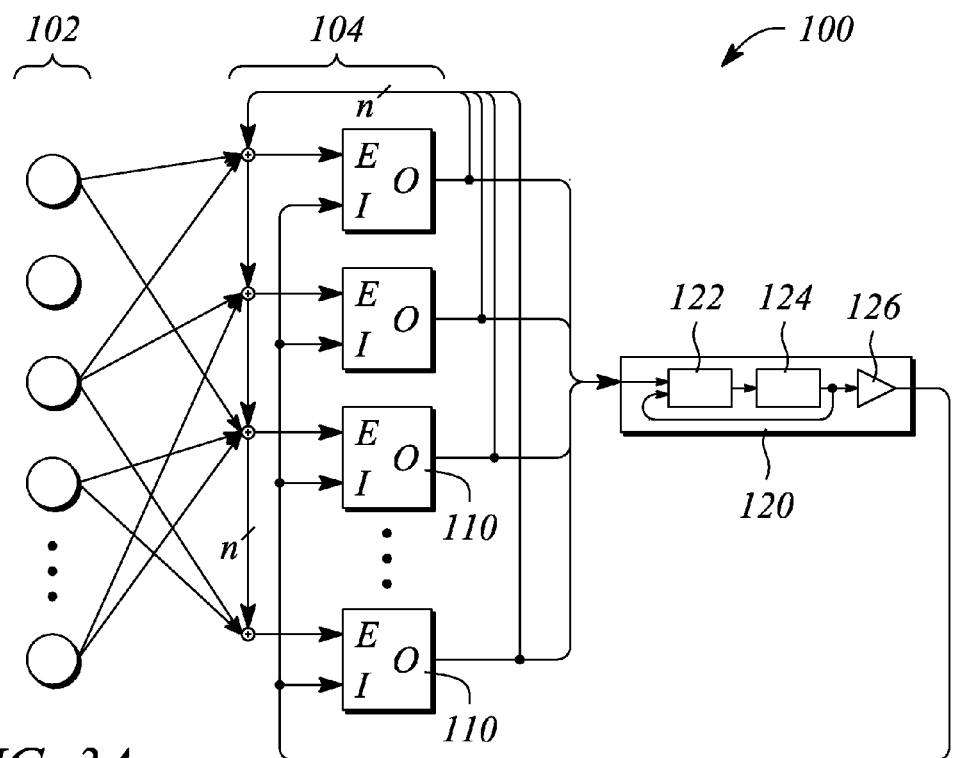
FIG. 3A illustrates a block diagram of a cortical neuromorphic network, according to an embodiment consistent with the principles of the present invention.

FIG. 3A illustrates a block diagram of a cortical neuromorphic network 100, according to an embodiment consistent with the principles of the present invention. The cortical neuromorphic network 100 is configured to receive feedforward spike signals from an input layer and to emulate the development of one of a cortical column and a cortical map development in a neocortex. In particular, physical connections between the cortical neuromorphic network 100 and selected ones of a plurality of input neurons in an input layer 102 provide feedforward spike signals to the cortical neuromorphic network 100. For example, the input layer 102 may comprise m input neurons, where m is an integer greater than two. The feedforward spike signals from the selected ones of the input neurons of the input layer 102 in combination with recurrent spike signals from within the cortical neuromorphic network 100 serve as excitatory signals for the cortical neuromorphic network 100. The excitatory signals initiate one of cortical column development and cortical map development in conjunction with spike timing dependent plasticity (STDP) of the cortical neuromorphic network 100. Cortical column development as opposed to cortical map development may be dictated by specific connections of or within the cortical neuromorphic network 100 (e.g., presence or absence of inhibition), according to various embodiments.

As illustrated in FIG. 3A, the cortical neuromorphic network 100 comprises a neuromorphic node 110. The neuromorphic node 110 is one of a plurality of neuromorphic nodes 110 arranged as a network layer 104 of the cortical neuromorphic network 100. For example, the network layer 104 may comprise n neuromorphic nodes 110, where n is an integer greater than one. The neuromorphic node 110 is configured to receive one or more of the feedforward spike signals from the selected ones of the input neurons within the input layer 102. The neuromorphic node 110 is further configured to provide a neuromorphic node output spike signal. The neuromorphic node output spike signal may be employed as a recurrent spike signal that is provided to all other neuromorphic nodes 110 in the network layer 104, according to some embodiments. For example, an output port O of the neuromorphic node 110 may be connected to an input of other neuromorphic nodes 110 of the network layer 104 to provide the recurrent spike signal to the neuromorphic nodes 110. In some embodiments, the output port O of the neuromorphic node 110 is connected to an input of each of the other neuromorphic nodes 110, as illustrated in FIG. 3A. According to various embodiments, a combination of the recurrent spike signals from the neuromorphic nodes 110 of the network layer 104 and the feedforward spike signals received from the selected ones of the input neurons of the input layer 102 is the excitatory spike signal of the neuromorphic node 110. For example, the excitatory spike signal received by the neuromorphic node 110 may comprise n recurrent spike signals (i.e., one each from the n neuromorphic nodes 110) and k feedforward spike signals from a set of k input neurons selected from the m input neurons of the input layer 102, where k is less than or equal to m. The excitatory spike signal may be received by an excitatory input E of the neuromorphic node 110, as illustrated.

Figure 3B:
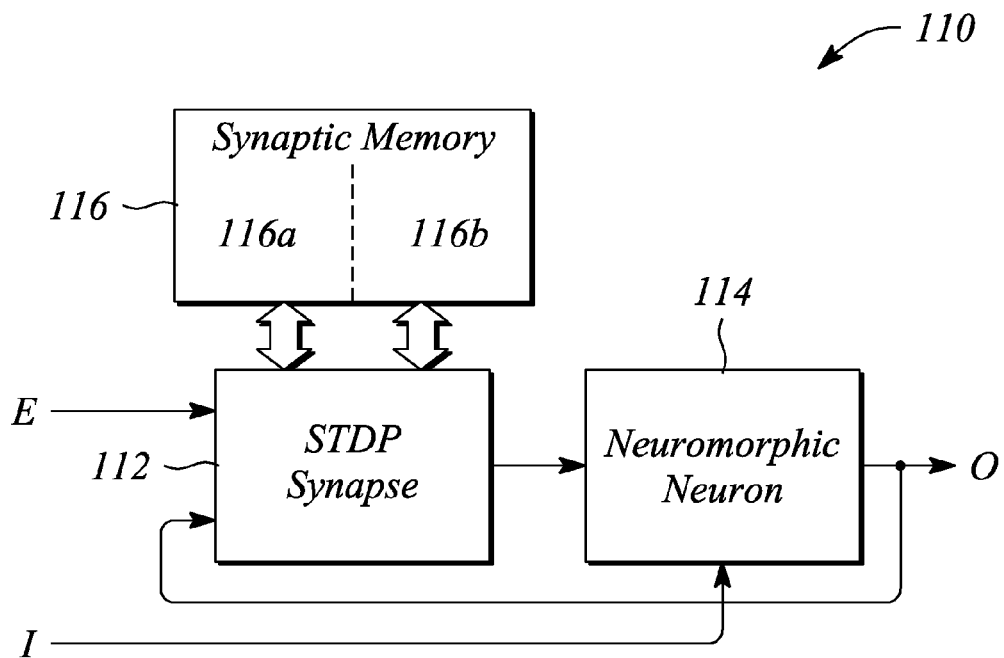
FIG. 3B illustrates a block diagram of a neuromorphic node of the cortical neuromorphic network of FIG. 3A, according to an embodiment consistent with the principles of the present invention.

FIG. 3B illustrates a block diagram of a neuromorphic node 110 of the cortical neuromorphic network 100 of FIG. 3A, according to an embodiment consistent with the principles of the present invention. According to various embodiments, the neuromorphic node 110 comprises a spike timing dependent plasticity (STDP) synapse 112 and a neuromorphic neuron 114. The STDP synapse 112 is connected to the input port of the neuromorphic node 110 and an input of the neuromorphic neuron 114 is connected to an output of the STDP synapse 112. The STDP synapse 112 is configured to receive and process the excitatory spike signal E of the neuromorphic node 110. The processed excitatory spike signal is then provided to the neuromorphic neuron 114. In particular, according to some embodiments, the STDP synapse 112 is configured to receive and weight the received excitatory spike signal according to an STDP synaptic conductance. The STDP synaptic conductance may be determined according to an STDP learning rule or curve (e.g., see discussion above) as a weight signal W(t). The weighted excitatory spike signal E is then provided to an excitatory input of the neuromorphic neuron 114 (e.g., as illustrated by an arrow connecting the STDP synapse 112 and neuromorphic neuron 114 in FIG. 3B), according to some embodiments.

In some embodiments, a single STDP synapse 112 is provided for each neuromorphic neuron 114. The single STDP synapse 112 may receive one or more excitatory spike signals (e.g., from a plurality of input neurons) by summing together individual excitatory spike signals to form a combined excitatory spike signal, for example. In other embodiments (not illustrated), there may be a plurality (e.g., two, three, four, or more) of STDP synapses 112 per neuromorphic neuron 114. Each STDP synapse 112 of the plurality may receive an excitatory spike signal from a different pathway or physical connection to the input neurons of the input layer 102, for example. In some examples, the pathways may be provided by a neural fabric, as described in the co-pending patent application Ser. No. 13/535,114 to Cruz-Albrecht et al., cited above.

Figure 4A:
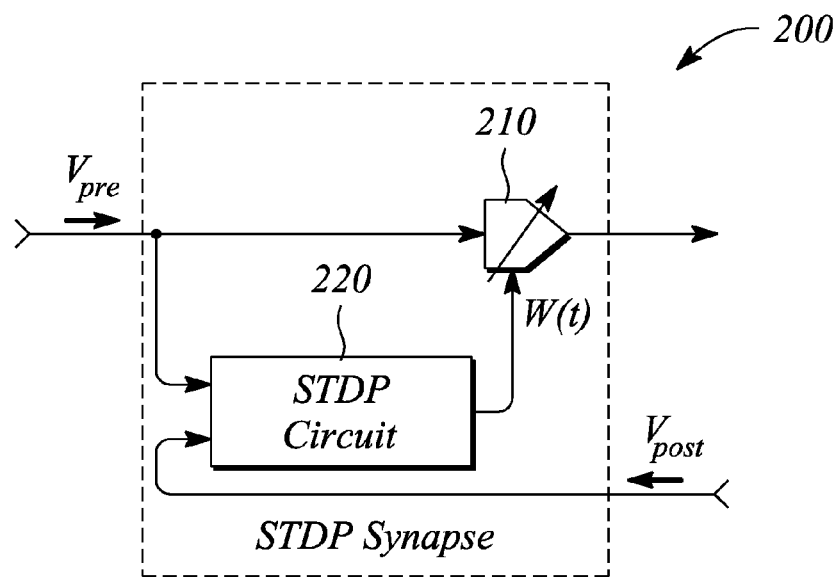
FIG. 4A illustrates a block diagram of a spike timing dependent plasticity (STDP) synapse, according to an embodiment consistent with the principles of the present invention.

FIG. 4A illustrates a block diagram of a spike timing dependent plasticity (STDP) synapse 200, according to an embodiment consistent with the principles of the present invention. In particular, the STDP synapse 200 may serve as a neuromorphic synapse that exhibits spike timing dependent plasticity (STDP), according to some examples. For example, the STDP synapse 200 may be employed as the STDP synapse 112 described above. In such an arrangement, a pre-synaptic spike signal $V_{pre}$ may comprise the excitatory spike signal of the neuromorphic node 110 and a post-synaptic spike signal $V_{post}$ may be an output spike signal provided by the neuromorphic neuron 114 of the neuromorphic node 110, for example.

As illustrated in FIG. 4A, the STDP synapse 200 comprises a synapse core 210. The synapse core 210 is configured to receive a pre-synaptic spike signal and to produce a weighted spike signal. In some examples (as illustrated in FIG. 4A), the pre-synaptic spike signal received by the synapse core 210 is the pre-synaptic signal $V_{pre}$ provided to the neuromorphic node (e.g., the neuromorphic node 110 illustrated in FIG. 3A) as the excitatory spike signal. According to various examples, the weighted spike signal that is produced by the synapse core 210 is weighted in accordance with a weight signal W(t). In particular, the weighted spike signal is the weighted excitatory spike signal provided to the neuromorphic neuron 114 illustrated in FIG. 3B, according to some examples. Further, the weight signal W(t) may be the STDP synaptic conductance, according to various examples.

In some embodiments, the synapse core 210 comprises a 1-bit digital-to-analog converter (DAC) with adjustable gain. In various examples, the 1-bit DAC has a signal input, weight input and an output. In some examples, the 1-bit DAC of the synapse core 210 is configured to receive the pre-synaptic spike signal $V_{pre}$ as a voltage spike train at the signal input. The 1-bit DAC is further configured to produce at the output the weighted spike signal. In some examples, the weighted spike signal is produced as a current spike train or equivalently as a current-based spike signal. According to various examples, the adjustable gain of the 1-bit DAC controls an amplitude value of spikes of the weighted spike signal. In particular, spikes in the weighted spike signal have timing that corresponds to timing of spikes in the pre-synaptic spike signal and amplitude values that are adjusted according to the weight signal W(t). In examples where the weighted spike signal is produced as a current spike train, the current spikes of the current spike train have amplitude values determined by the adjustable gain according to the weight signal W(t).

The STDP synapse 200 further comprises a spike timing dependent plasticity (STDP) circuit 220. The STDP circuit 220 has a first input to receive the pre-synaptic spike signal $V_{pre}$ (e.g., the excitatory spike signal) and a second input to receive the post-synaptic spike signal $V_{post}$. The STDP circuit 220 also has an output configured to produce the weight signal W(t). As illustrated, the output of the STDP circuit 220 is connected to the weight input of the 1-bit DAC of the synapse core 210.

Figure 4B:
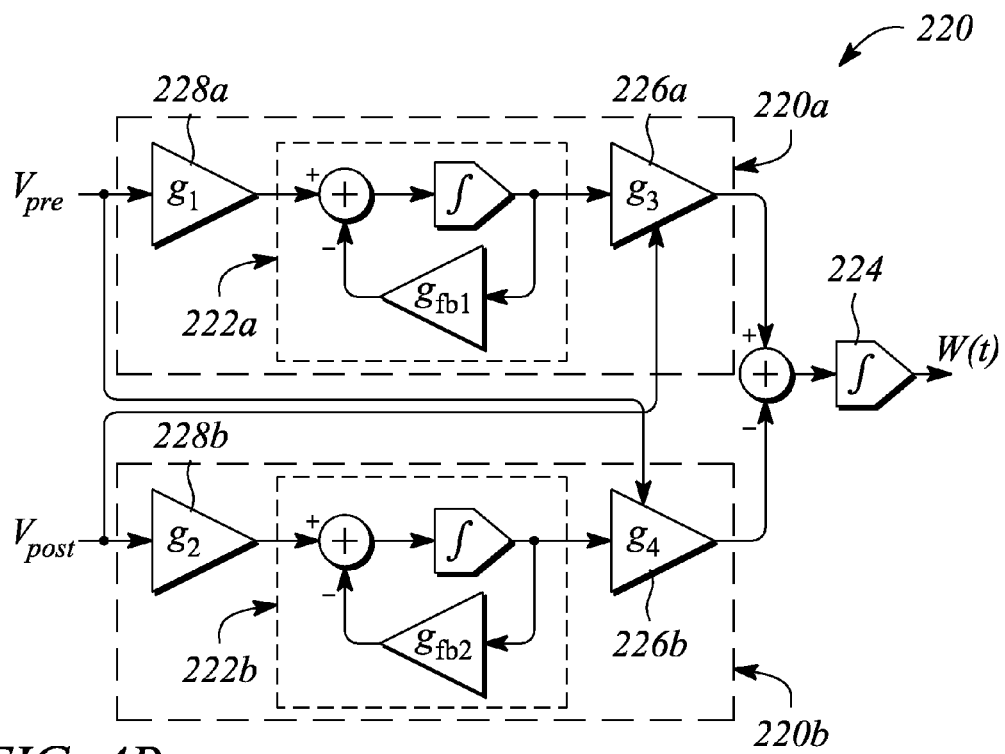
FIG. 4B illustrates a block diagram of a spike timing dependent plasticity (STDP) circuit, according to an embodiment consistent with the present invention.

FIG. 4B illustrates a block diagram of a spike timing dependent plasticity (STDP) circuit 220, according to an embodiment consistent with the present invention. As illustrated in FIG. 4B, the STDP circuit 220 comprises a first leaky integrator 222a. In some examples, a leaky integrator (e.g., the first leaky integrator 222a) may be implement as a low pass filter. The first leaky integrator 222a is configured to receive as a first spike signal the pre-synaptic spike signal $V_{pre}$, according to various examples. The first leaky integrator 222a is further configured to convert the first spike signal into a decaying exponential signal at an output of the first leaky integrator 222a. The decaying exponential signal at the output of the first leaky integrator 222a is gated to produce a first gated integrated signal. In various examples, gating of the first leaky integrator output is provided by or in accordance with a second spike signal. The second spike signal may be the post-synaptic spike signal $V_{post}$, according to various examples.

The STDP circuit 220 further comprises a second leaky integrator 222b. The second leaky integrator 222b is configured to receive the second spike signal. The second leaky integrator 222b is further configured to convert the second spike signal into a decaying exponential signal at an output of the second leaky integrator 222b. The decaying exponential signal at the output of the second leaky integrator 222b is gated to produce a second gated integrated signal. In various examples, gating of the second leaky integrator output is provided by or in accordance with the first spike signal.

According to some embodiments (as illustrated), the first and second leaky integrators 222a, 222b each comprise an integrator and a feedback amplifier. The feedback amplifiers each receive an output signal from a respective one of the integrators and produce a feedback signal. The feedback signal produced by the feedback amplifier of the first leaky integrator 222a is subtracted from the first spike signal at an input of the first leaky integrator 222a prior to signal integration by the integrator of the first leaky integrator 222a. Similarly, the feedback signal produced by the feedback amplifier of the second leaky integrator 222b is subtracted from the second spike signal at an input of the second leaky integrator 222b prior to signal integration by the integrator of the second leaky integrator 222b.

Subtraction of feedback signals from respective ones of the first and second spike signals may be provided by a summing circuit at a negative input thereof, as illustrated in leaky integrators 222a and 222b, for example. In another example, a gain $g_{fb}$ of the respective feedback amplifiers may be negative (e.g., $S_{out} = -g_{fb} \cdot S_{in}$ (not illustrated)) and the summing circuits of the respective leaky integrators 222a, 222b may simply sum the feedback signals with the respective first and second spike signals.

The feedback gain $g_{fb}$ of the respective feedback amplifiers may be used to establish and control a time decay constant t associated with an STDP learning rule of the STDP circuit 220. For example, a feedback gain $g_{fb1}$ of the first leaky integrator 222a feedback amplifier may be used to establish a positive time decay constant $\tau^+$ of the STDP learning rule. In some examples, the first leaky integrator 222a feedback amplifier feedback gain $g_{fb1}$ may be about 0.1. Similarly, a feedback gain $g_{fb2}$ of the second leaky integrator 222b feedback amplifier may be used to establish a negative time decay constant $\tau^-$ of the STDP learning rule. In some examples, the second leaky integrator 222b feedback amplifier feedback gain $g_{fb2}$ may be about 0.1. In some examples, the feedback gains $g_{fb1}$, $g_{fb2}$ may be adjustable to facilitate changing one or both of the positive and negative decay constants $\tau^+$, $\tau^-$ in situ. In other examples, one or both of the feedback gains $g_{fb1}$, $g_{fb2}$ is a fixed, predetermined value.

According to some embodiments, a leaky integrator such as the first and second leaky integrators 222a, 222b may be implemented using a resistor and a capacitor. For example, a shunt resistor in parallel with a shunt capacitor may be used to implement a leaky integrator when the STDP circuit 220 is realized as an integrated circuit. A resistance value $R_1$ of the shunt resistor and a capacitance value $C_1$ of the shunt capacitor may be used to set the positive decay constant $\tau^+$ when the shunt resistor and the shunt capacitor are used to implement the first leaky integrator 222a, for example. In particular, a product of the resistance value $R_1$ and the capacitance value $C_1$ may determine the positive decay constant $\tau^+$ (e.g., $\tau^+ = R_1 \cdot C_1$) when using the shunt resistor and the shunt capacitor to implement the first leaky integrator 222a, for example. A resistance $R_1$ of about 100-400 (e.g., 200) kilo-Ohms (kΩ) and a capacitance $C_1$ of about 120-240 femtofarads (fF) may be used, for example.

Similarly, for example, a resistance value $R_2$ of a shunt resistor and a capacitance value $C_2$ of a shunt capacitor may be used to set the negative decay constant $\tau^-$ when the shunt resistor and the shunt capacitor are used to implement the second leaky integrator 222b. In particular, the negative decay constant $\tau^-$ may be determined as a product of the resistance value $R_2$ and the capacitance value $C_2$ (e.g., $\tau^- = R_2 \cdot C_2$), for example. In a particular example, a resistance $R_2$ of about 100-400 kΩ (e.g., 200 kΩ) and a capacitance $C_2$ of about 120-240 fF may be used. According to some examples, the shunt resistor may have a fixed resistance value producing a fixed and predetermined decay constant $\tau^+$, $\tau^-$, while in other examples, the shunt resistor may have a programmable resistance facilitating adjustment of one or both of the decay constants $\tau^+$, $\tau^-$ in situ.

Referring to FIG. 4B, the STDP circuit 220 further comprises an output integrator 224. The output integrator 224 is configured to integrate a difference of the first gated integrated signal and the second gated integrated signal to produce the weight signal W(t). In some examples, a summing circuit of the output integrator 224 having a positive input and a negative input is employed between outputs of the leaky integrators 222a, 222b and an input of the output integrator 224. The summing circuit of the output integrator 224, having positive and negative inputs, subtracts the second gated integrated signal at the negative input from the first gated integrated signal at the positive input to produce the difference. The difference is then integrated by the output integrator 224. In other examples, an overall signal gain of a first signal path 220a of the STDP circuit 220 that includes the first leaky integrator 222a is positive and an overall signal gain of a second signal path 220b of the STDP circuit 220 that includes the second leaky integrator 222b is negative (i.e., the overall signal gains of the first and second signal paths 220a, 220b, respectively, have opposite polarities). In these examples, the difference may be provided by simply adding together the first and second gated integrated signals with a summing circuit.

According to some embodiments, the output integrator 224 may be a saturating integrator. For example, the saturating integrator is an integrator having an output signal that is limited or saturates at one or both of a predetermined maximum value and a predetermined minimum value. As such, an output signal of the saturating integrator may increase or decrease according to a transfer characteristic of the output integrator 224 (e.g., according to 1/s), but not beyond the predetermined maximum value and the predetermined minimum value, for example. In other examples, the output integrator 224 is a substantially non-saturating integrator.

In some embodiments, the STDP circuit 220 further comprises a first gating circuit 226a at the output of the first leaky integrator 222a. The first gating circuit 226a is configured to receive the second spike signal and to provided the gating of the first gated integrated signal according to the second spike signal. In some examples, the STDP circuit 220 further comprises a second gating circuit 226b at an output of the second leaky integrator 222b. The second gating circuit 226b is configured to receive the first spike signal and to provide the gating of the second gated integrated signal according to the first spike signal.

In some embodiments (e.g., as illustrated in FIG. 4B), the first gating circuit 226a is a first gated transconductance amplifier 226a, having a gain $g_3$, connected between the output of the first leaky integrator 222a and the input of the output integrator 224. The first gated transconductance amplifier 226a has a voltage input to receive a first integrated signal from the first leaky integrator 222a, an enable input to receive the second spike signal, and a current output to produce the first gated integrated signal. As a transconductance amplifier, the first gated transconductance amplifier 226a converts a voltage-based signal (e.g., the first integrated signal) into a current-based signal (e.g., the first gated integrated signal) that is scaled by the gain $g_3$. In addition, the first gating transconductance amplifier 226a gates the first integrated signal received at the voltage input according to the second spike signal at the enable input. For example, when a spike is present in the second spike signal, the gating transconductance amplifier 226a produces a current-based signal at the current output that is proportional to the first integrated signal provided by the first leaky integrator 222a. However, when a spike is absent in the second spike signal at the enable input, the gating transconductance amplifier 226a produces no output (i.e., the output current is about zero).

As a result, the first gated integrated signal is the current-based signal during time intervals corresponding to spikes in the second spike signal, and is zero otherwise. Further, the gain $g_3$ of the transconductance amplifier 226a establishes the proportionality of the current-based output signal and the first integrated signal. As such, during time intervals that correspond to spikes in the second spike signal, the first gated integrated signal has an amplitude of the first integrated signal during that time interval which is scaled by the gain $g_3$ of the first transconductance amplifier 226a. Otherwise the gated first integrated signal is zero. Moreover, the first gated integrated signal is a spike signal with spike timing corresponding to the second spike signal.

In some embodiments (e.g., as illustrated in FIG. 4B), the second gating circuit 226b is a second gated transconductance amplifier 226b connected between the output of the second leaky integrator 222b and the input of the output integrator 224. The second gated transconductance amplifier 226b has a gain $g_4$ and has a voltage input to receive a second integrated signal from the second leaky integrator 222b, an enable input to receive the first spike signal, and a current output to produce the second gated integrated signal. The second gated transconductance amplifier 226b may be substantially similar to the first gated transconductance amplifier 226a but with the gain $g_4$. As a result, the second gated integrated signal is the second integrated signal in the form of a current-based signal during time intervals corresponding to spikes in the first spike signal, and is zero otherwise. Similarly, the second gated integrated signal has an amplitude that is scaled by the second transconductance amplifier gain $g_4$ during the spike time intervals of the first spike signal. As such, the second gated integrated signal is a spike signal with a spike timing corresponding to the first spike signal.

In some examples that include the first and second gated transconductance amplifiers 226a, 226b, the first and second gated integrated signals are summed by a wire junction. That is, the summing circuit of the output integrator 224 may comprise a pair of wires connected together, a first wire of the pair carrying the current-based first gated integrated signal and a second wire of the pair carrying the current-based second gated integrated signal. Further in these examples, the polarity difference that results in the subtraction of the second gated integrated signal from the first gated integrated signal may be provided by a polarity difference between the first signal path 220a and the second signal path 220b. Some or all of the polarity difference between the first signal path 220a and second signal path 220b may be provided by the transconductance amplifier gains $g_3$, $g_4$, according to some examples. For example, the second transconductance amplifier gain $g_4$ may be similar in magnitude but opposite in sign when compared to the first transconductance amplifier gain $g_3$ (e.g., $g_4 = -g_3$). In some examples, an absolute value of the transconductance amplifier gains $g_3$, $g_4$ may be used to either establish or at least contribute to a respective one of a positive amplitude $A^+$ and a negative amplitude $A^-$ of the STDP learning curve of the STDP circuit 220, as will be discussed in more detail below.

In some embodiments, the STDP circuit 220 further comprises a first input transconductance amplifier 228a connected between an input of the STDP circuit 220 and an input of the first leaky integrator 222a. The first input transconductance amplifier 228a is configured to scale or amplify the first spike signal. The first input transconductance amplifier 228a has a gain of $g_1$. According to various examples, the first input transconductance amplifier 228a is configured to operate in continuous time (i.e., the first input transconductance amplifier 228a is not gated) with gain $g_1$ and to convert the first spike signal from a voltage-based signal form to a current-based signal form. Further, the current-based signal form of the first spike signal generally has a non-zero value corresponding to a non-zero value of the voltage-based signal form of the first spike signal present at the input of the STDP circuit 220 during a spike interval, and has a zero value otherwise. Moreover, the non-zero value is scaled by the gain $g_1$ of the first input transconductance amplifier 228a.

In some examples, the STDP circuit 220 further comprises a second input transconductance amplifier 228b having a gain $g_2$. The second input transconductance amplifier 228b is connected between a second input of the STDP circuit 220 and an input of the second leaky integrator 222b. The second input transconductance amplifier 228b is configured to amplify or scale the second spike signal according to the gain $g_2$ and further to convert the second spike signal from a voltage-based form to a current-based form. Except for the gain $g_2$, the second input transconductance amplifier 228b may be substantially similar to the first input transconductance amplifier 228a, according to various examples.

In some examples, an absolute value of the input transconductance amplifier gains $g_1$, $g_2$ may be used to establish a respective one of the STDP amplitudes $A^+$, $A^-$ of the STDP learning curve of the STDP circuit 220. For example, the first input transconductance amplifier gain $g_1$ may be used to set the overall gain of the first path 220a (e.g., when a magnitude of $g_3$=1 or may be so normalized). The overall gain of the first path 220a establishes the positive amplitude $A^+$ of the STDP learning curve, according to some examples. Similarly, the second input transconductance amplifier gain $g_2$ may be used to set the overall gain of the second path 220b (e.g., when a magnitude of $g_4$=1 or may be so normalized) and thus establish the negative amplitude $A^-$ of the STDP learning curve, according to some examples. In other examples, a combination of gains (e.g., $g_1$ and $g_3$ for the first path 220a and $g_2$ and $g_4$ for the second path 220b) is used to set the respective positive and negative amplitudes $A^+$, $A^-$ of the STDP learning curve. In these examples, each of the gains $g_1$ and $g_3$ contributes to the overall gain of the first signal path 220a and thus to the STDP learning curve amplitude A. Similarly, each of the gains $g_2$ and $g_4$ contributes to the overall gain of the second signal path 220b and thus to the STDP learning curve negative amplitude K. Other gains (e.g., a gain of the leaky integrators 222a, 222b) may also contribute to the STDP learning curve amplitudes $A^+$, $A^-$, according to some examples.

According to some embodiments, each of the gains $g_1$, $g_2$, $g_3$ and $g_4$ may be fixed, predetermined values. In other examples, one or more of the gains $g_1$, $g_2$, $g_3$ and $g_4$ may be programmable. For example, either fixed or programmable bias resistors of the respective ones of the transconductance amplifiers 226a, 226b, 228a, 228b may be used to set the various gains $g_1$, $g_2$, $g_3$ and $g_4$.

In some embodiments, one or both of the input transconductance amplifiers 228a, 228b are limiting transconductance amplifiers. A limiting amplifier is defined as an amplifier that establishes or 'limits' an output signal level to be less than a particular value (i.e., the limiting level). A limiting amplifier may be used to convert a spike signal having spike amplitudes that vary from one spike to a next spike into a spike signal that has substantially equal amplitude spikes. The limiting transconductance amplifier is a transconductance amplifier that also acts as a limiting amplifier. The input transconductance amplifiers 228a, 228b, as limiting transconductance amplifiers, may be configured to provide signal limiting of respective ones of the first and second spike signals such that all of the spikes in the first and second spike signals at an output of the input transconductance amplifiers 228a, 228b have substantially equal amplitudes. In some embodiments, the STDP synapse 112 (of FIG. 3B) may be substantially similar to an STDP synapse described in a co-pending patent "Spike Timing Dependent Plasticity Apparatus, System and Method" application Ser. No. 13/415,812 filed Mar. 8, 2012 to Cruz-Albrecht et al., incorporated herein by reference.

Referring again to FIG. 3B, according to some embodiments, the neuromorphic neuron 114 may comprise an integrate-and-fire neuromorphic neuron. The integrate-and-fire neuromorphic neuron may have an excitatory input to receive the excitatory input spike signal received by the neuromorphic node 110. The received excitatory input spike signal may be weighted according an STDP synaptic conductance or weight signal W(t) of the STDP synapse 112, according to some examples. Further, the integrate-and-fire neuromorphic neuron may have a second input (e.g., an inhibitory input I) to receive an inhibitory spike signal. The integrate-and-fire neuromorphic neuron also has an output configured to provide the output spike signal of the neuromorphic node 110.

As illustrated in FIG. 3B, the neuromorphic node 110 further comprises a synaptic memory 116 associated with the STDP synapse 112, according to some embodiments. In various embodiments, the synaptic memory 116 is configured to store a STDP synaptic conductance W(t) and a potentiation value P of the STDP synapse 112. In some embodiments, the cortical neuromorphic network 100 is configured to operate according to synaptic time multiplexing (STM). In these embodiments, the synaptic memory 116 stores the STDP synaptic conductance W(t) and a potentiation value P for retrieval during a cycle and in some instances, a particular time slot of the STM. In particular, one or both of the stored STDP synaptic conductance W(t) and the stored potentiation value P may be retrieve and employed during the STM cycle. Further, one or both of the stored STDP synaptic conductance W(t) and the stored potentiation value P may be updated in the synaptic memory 116 during or at an end of the STM cycle, according to some embodiments.

In some embodiments, the synaptic memory 116 comprises a non-volatile memory 116a and a volatile memory 116b. For example, the non-volatile memory 116a may be configured to store the STDP synaptic conductance W(t). The volatile memory 116b may be configured to store the potentiation value P, for example. According to some examples, the non-volatile memory 116a may be implemented using any of a variety of memory technologies including, but not limited to, flash memory and nanoscale resistance memory (e.g., memristor memory). According to some examples, the volatile memory 116b may be implemented as a capacitance (e.g., a capacitor), wherein a charge stored by the capacitance represents the potentiation value P, for example.

In some embodiments (not illustrated), the neuromorphic node 110 further comprises a connection router. The connection router is configured to receive input spike signals including the excitatory spike signal at an input of the neuromorphic node 110. The connection router is further configured to route the received input spike signals to the STDP synapse and the neuromorphic neuron according to a synaptic routing map and during a predetermined time slot of a cycle of the STM. The connection router may comprise a controller that controls switches of a neural fabric used to implement the cortical neuromorphic network 100, for example. In other examples, the connection router may comprise a switch configured to receive spike signals (e.g., on a signal bus) during a designated time slot of the STM cycle.

Referring again to FIG. 3A, the cortical neuromorphic network 100 may further comprise an inhibitory neuromorphic node 120, according to some embodiments. When the inhibitory neuromorphic node 120 is absent, the neuromorphic network 100 may implement a cortical column, for example. However, when the inhibitory neuromorphic node 120 is present, the neuromorphic network 100 may implement a cortical map. In particular, the inhibitory neuromorphic node 120 may produce an inhibitory spike signal at an output. The inhibitory spike signal may be provided to an inhibitory input I of the neuromorphic node(s) 110 of the cortical neuromorphic network 100 to implement the cortical map, according to some embodiments.

As illustrated in FIG. 3A, the inhibitory neuromorphic node 120 comprises an STDP synapse 122 to receive and weight recurrent spike signals from the neuromorphic nodes 110 of network layer. The recurrent spike signals may comprise output spike signals of all of the neuromorphic nodes 110 of the network layer, according to some embodiments. In some examples, the STDP synapse 122 may be substantially similar to the STDP synapse 112 described above with respect to the neuromorphic node 110.

In some embodiments, the inhibitory neuromorphic node 120 further comprises a neuromorphic neuron 124 to receive the weighted recurrent spike signals from the STDP synapse 122, for example as illustrated in FIG. 3A. According to various examples, the neuromorphic neuron 124 may be substantially similar to the neuromorphic neuron 114 described above with respect to the neuromorphic node 110. In particular, the neuromorphic neuron 124 may comprise an integrate-and-fire neuromorphic neuron, in some embodiments.

In some embodiments, the inhibitory neuromorphic node 120 further comprises an interneuron inhibition gain block 126, for example as illustrated in FIG. 3A. The interneuron inhibition gain block 126 is configured to amplify an output spike signal of the neuromorphic neuron 124 according to an inhibition gain to produce the inhibitory spike signal, according to various embodiments. As provided above, the inhibitory spike signal is received at the inhibitory input I of the neuromorphic nodes 110.

Figure 5:
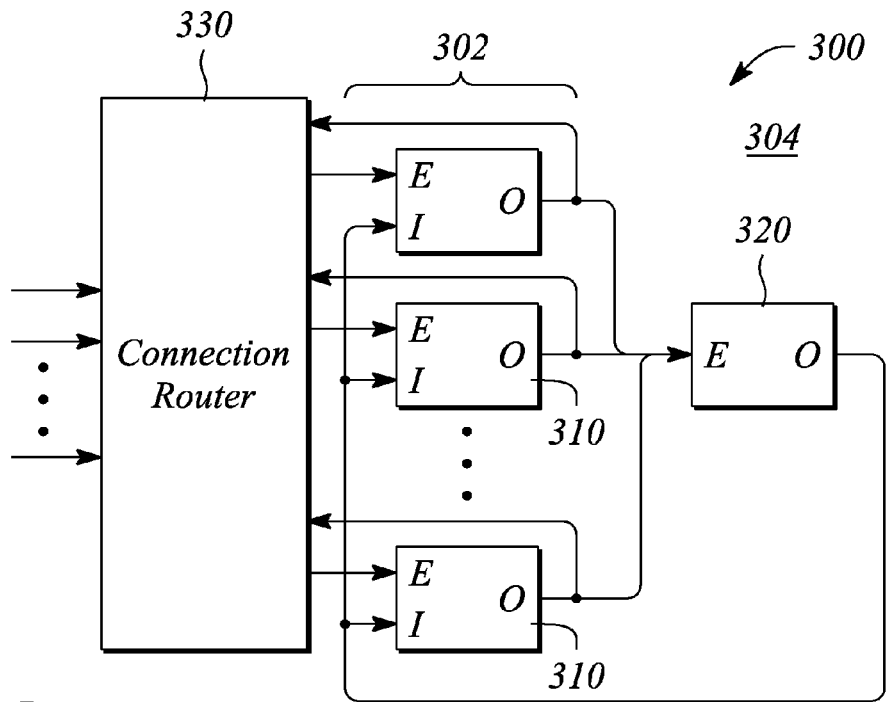
FIG. 5 illustrates a block diagram of a synaptic time multiplexing (STM) cortical neuromorphic system, according to an embodiment consistent with the present invention.

FIG. 5 illustrates a block diagram of a synaptic time multiplexing (STM) cortical neuromorphic system 300, according to an embodiment consistent with the present invention. In particular, the STM cortical neuromorphic system 300 provides a network layer 302 configured to operate according to a cycle and to time slots of synaptic time multiplexing (STM). The STM may be provided by an STM timing system 304 comprising an STM controller (not illustrated), for example. In some embodiments, the STM cortical neuromorphic system 300 may implement a cortical column (i.e., provide cortical column development). In other embodiments, a cortical map is implemented by the STM cortical neuromorphic system 300.

As illustrated in FIG. 5, the STM cortical neuromorphic system 300 comprises a plurality of neuromorphic nodes 310 arranged as the network layer 302. The neuromorphic nodes 310 of the plurality are configured to receive excitatory spike signals. According to various embodiments, the excitatory spike signals represent a combination of recurrent spike signals and feedforward spike signals. In some embodiments, the recurrent spike signals are produced by the neuromorphic nodes 310 of the plurality in the network layer 302. In particular, the recurrent spike signals comprise outputs from the neuromorphic nodes 310 of the network layer 302, according to some examples (e.g., all of the nodes 310, as illustrated). In some embodiments, the feedforward spike signals represent output spike signals from a plurality of input neurons of an input layer (not illustrated in FIG. 5). The feedforward spike signals received by a particular one of the neuromorphic nodes 310 may be from or representing selected ones of the input neurons, for example. Further, a first neuromorphic node 310 of the plurality may receive feedforward spike signals from a set of input neurons that differs from a set of input neurons that provides feedforward spike signals received by a second neuromorphic node 310 of the plurality, according to various examples.

In various embodiments, at least one of, or for example, each neuromorphic node 310 comprises a synapse, a neuromorphic neuron and a synaptic memory associated with the synapse. The neuromorphic neuron is configured to receive input signals from the synapse and the synaptic memory is configured to store parameters (e.g., a synaptic conductance and a potentiation) used by the synapse during an STM cycle. In some embodiments, the synapse is a spike timing dependent plasticity (STDP) synapse. In some embodiments, the neuromorphic neuron comprises an integrate-and-fire neuron.

In some embodiments, the neuromorphic node 310 is substantially similar to the neuromorphic node 110 described above with respect to the cortical neuromorphic network 100. In particular, the STDP synapse may be substantially similar to the STDP synapse 112 and the neuromorphic neuron may be substantially similar to the neuromorphic neuron 114, described above, according to some embodiments. Similarly, the synaptic memory may be substantially similar to the synaptic memory 116 described above with respect to the cortical neuromorphic network 100.

In some embodiments, the STDP synapse of the neuromorphic node 310 is configured to receive the excitatory spike signal of or provided to the neuromorphic node 310 at an excitatory input E. The STDP synapse is further configured to weight the excitatory spike signal according to an STDP synaptic conductance and to provide the weighted excitatory spike signal to an excitatory input of the neuromorphic neuron. In some embodiments, the synaptic memory of the neuromorphic node 310 is configured to update and store the STDP synaptic conductance and a potentiation value of the STDP synapse during each STM cycle. An output spike signal of the neuromorphic node 310 may be provided at an output O (e.g., as a recurrent spike signal).

In some embodiments, the synaptic memory of the neuromorphic node 310 comprises a non-volatile memory and a volatile memory. For example, the non-volatile memory may be configured to store the STDP synaptic conductance. The volatile memory may be configured to store potentiation value, for example. One or both of the STDP synaptic conductance (e.g., in the non-volatile memory) and the potentiation value (e.g., in the volatile memory) may be stored at an end of an STM cycle, according to some embodiments. The stored STDP synaptic conductance and the potentiation value may be updated according to characteristics of the STDP synapse produced during the STM cycle, for example.

In some embodiments (as illustrated in FIG. 5), the STM cortical neuromorphic system 300 further comprises an inhibitory neuromorphic node 320. The inhibitory neuromorphic node 320 is configured to receive the recurrent spike signals from the neuromorphic nodes 310 of the plurality (e.g., via outputs O) and to provide an inhibitory spike signal to the neuromorphic nodes 310 at inhibitory inputs I of the neuromorphic nodes 310, for example. When the inhibitory neuromorphic node 320 is present, the STM cortical neuromorphic system 300 may implement a cortical map (i.e., provide cortical map development), according to some embodiments.

In some embodiments, the inhibitory neuromorphic node 320 may be substantially similar to the inhibitory neuromorphic node 120. In particular, in some examples, the inhibitory neuromorphic node 320 comprises an STDP synapse similar to STDP synapse 122 illustrated in FIG. 3A to receive and to apply an STDP weight to the recurrent spike signals during a predetermined time slot of the STM cycle. The inhibitory neuromorphic node 320 further comprises a neuromorphic neuron similar to the neuromorphic neuron 124 illustrated in FIG. 3A to receive the weighted recurrent spike signals and to produce an output spike signal, according to some examples. Further according to some examples, the inhibitory neuromorphic node 320 comprises an interneuron inhibition gain block similar to the interneuron inhibition gain block 126 also illustrated in FIG. 3A to amplify the output spike signal of the neuromorphic neuron according to an inhibition gain to produce the inhibitory spike signal.

In some embodiments, the STM cortical neuromorphic system 300 may further comprise a connection router 330, according to some embodiments. The connection router 330 is configured receive input spike signals including the excitatory spike signals. The excitatory spike signals may include recurrent spike signals routed from outputs O of the neuromorphic nodes 310, as illustrated. The connection router 330 is further configured to route the received input spike signals to the STDP synapse and the neuromorphic neuron according to a synaptic routing map during a predetermined time slot of a cycle of the STM. In some embodiments, the connection router 330 may be substantially similar to the connection router of the neuromorphic node 110, described above with respect to the neuromorphic network 100. In some examples, the connection router 330 may be a portion of a controller and switch matrix of a neural fabric that is used to implement the STM cortical neuromorphic system 300 (e.g., see co-pending patent application Ser. No. 13/535,114, cited above).

Figure 6:
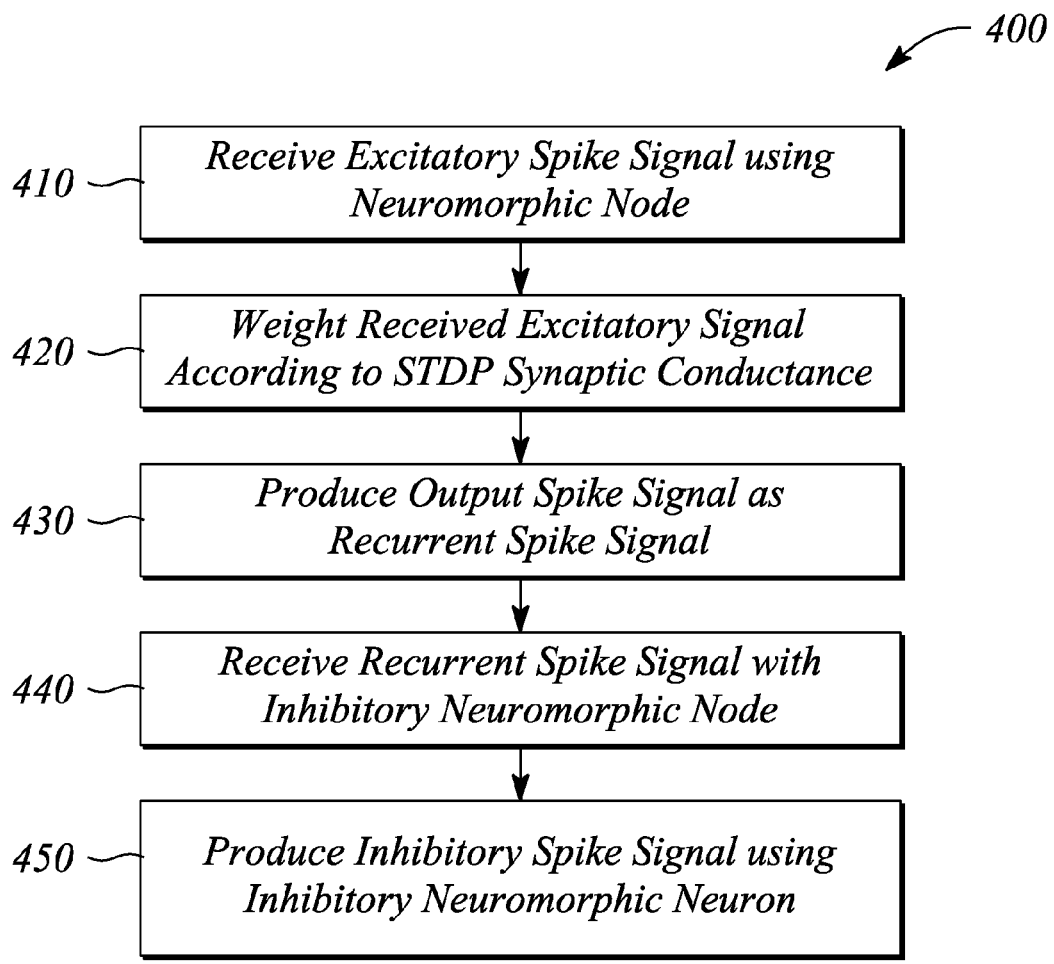
FIG. 6 illustrates a flow chart of a method of neuromorphic cortical operation, according to an embodiment consistent with the principles of the present invention.

FIG. 6 illustrates a flow chart of a method 400 of neuromorphic cortical operation, according to an embodiment consistent with the principles of the present invention. The method 400 of neuromorphic cortical operation may employ a neuromorphic network that is substantially similar to the cortical neuromorphic network 100, described above, according to some examples. In other examples, the method 400 of neuromorphic cortical operation may employ a neuromorphic system that is substantially similar to the synaptic time multiplexing cortical neuromorphic system 300, described above.

In some embodiments, the method 400 of neuromorphic cortical operation comprises receiving 410 an excitatory spike signal using a neuromorphic node. According to various embodiments, the neuromorphic node comprises a spike timing dependent plasticity (STDP) synapse and a neuromorphic neuron. The neuromorphic node may be one of a plurality of neuromorphic nodes arranged as a network layer, according to various embodiments.

The method 400 of neuromorphic cortical operation further comprises weighting 420 the received excitatory spike signal. Weighting 420 the signal may be provided by the STDP synapse, for example. The received excitatory spike signal may be weighted 420 according to an STDP synaptic conductance of the STDP synapse, in various examples.

The method 400 of neuromorphic cortical operation further comprises producing 430 an output spike signal by processing the weighted excitatory spike signal using the neuromorphic neuron. The output spike signal is a recurrent spike signal of the neuromorphic node, according to some examples. In various embodiments, the excitatory spike signal comprises a combination of recurrent spike signals from each of the neuromorphic nodes of the network layer and feedforward spike signals received from selected ones of input neurons of an input layer.

In some embodiments, the method 400 of neuromorphic cortical operation further comprises receiving 440 the recurrent spike signals with an inhibitory neuromorphic node. In some embodiments, the method 400 of neuromorphic cortical operation further comprises producing 450 an inhibitory spike signal from the received recurrent spike signals using the inhibitory neuromorphic node. The inhibitory spike signal may be provided as an inhibitory input to the neuromorphic nodes of the network layer to implement a cortical map, according to various embodiments. In other embodiments, an inhibitory spike signal is not provided (e.g., the recurrent spike signals are not received by the inhibitory neuromorphic node) and a cortical column is implemented instead of a cortical map.

In some embodiments, the neuromorphic nodes are operated according to a cycle and to time slots of a synaptic time multiplexing to provide receiving 410 the excitatory spike signal, weighting 420 the received excitatory spike signal and producing 430 the output spike signal. For example, the neuromorphic nodes may be part of the synaptic time multiplexing cortical neuromorphic system 300, described above.

In some embodiments (not illustrated), the method 400 of neuromorphic cortical operation further comprises retrieving the STDP synaptic conductance and a potentiation value stored in a synaptic memory associated with the STDP synapse at a beginning of a predetermined time slot to which the neuromorphic node is assigned. The synaptic memory may comprise a non-volatile portion to store the STDP synaptic conductance and a volatile portion to store the potentiation value, for example. Further, for example, the synaptic memory may be substantially similar to the synaptic memory 116, described above with respect to the cortical neuromorphic network 100. The method 400 of neuromorphic cortical operation may further comprise using the retrieved STDP synaptic conductance and potentiation value in weighting 420 the received excitatory spike signal during the predetermined time slot, according to some embodiments (not illustrated). Further, according to some embodiments (not illustrated), the method 400 of neuromorphic cortical operation may comprise updating the STDP synaptic conductance and potentiation value at an end of the predetermined time slot. The updated STDP synaptic conductance and potentiation value may be stored in the synaptic memory and replace the previously stored STDP synaptic conductance and potentiation value, according to some embodiments. In some embodiments (not illustrated), the method 400 of neuromorphic cortical operation further comprises routing input spike signals including the excitatory spike signal at an input of the neuromorphic node to the STDP synapse and to the neuromorphic neuron of the neuromorphic node according to a synaptic routing map and during a predetermined time slot of a cycle of the STM.

Thus, there have been described examples of a cortical neuromorphic network, a synaptic time multiplexing cortical neuromorphic system and a method of neuromorphic cortical operation having neuromorphic nodes arranged as a network layer. It should be understood that the above-described examples are merely illustrative of some of the many specific examples that represent the principles consistent with the principles described herein. Clearly, those skilled in the art can readily devise numerous other arrangements without departing from the scope consistent with the principles described herein as defined by the following claims.

What is claimed is:

1. A cortical neuromorphic network comprising:
a neuromorphic node comprising a spike timing dependent plasticity (STDP) synapse and a neuromorphic neuron, the neuromorphic node being a node of a plurality of neuromorphic nodes arranged as a network layer to receive a feedforward spike signal from selected ones of a plurality of input neurons of an input layer and to provide a neuromorphic node output spike signal as a recurrent spike signal to the neuromorphic nodes of the network layer,
wherein a combination of the recurrent spike signals from the neuromorphic nodes of the network layer and the feedforward spike signals received from the selected ones of the input layer input neurons is an excitatory spike signal to the neuromorphic node.

2. The cortical neuromorphic network of claim 1, wherein the STDP synapse is configured to receive the excitatory spike signal of the neuromorphic node, to weight the excitatory spike signal according to an STDP synaptic conductance, and to provide the weighted excitatory spike signal as an excitatory input to the neuromorphic neuron.

3. The cortical neuromorphic network of claim 2, wherein the STDP synapse comprises:
   a first leaky integrator to receive the excitatory spike signal, an output of the first leaky integrator being gated to produce a first gated integrated signal;
   a second leaky integrator to receive an output spike signal of the neuromorphic neuron, an output of the second leaky integrator being gated to produce a second gated integrated signal; and
   an output integrator to integrate a difference of the first gated integrated signal and the second gated integrated signal to produce a weight signal corresponding to the STDP synaptic conductance,
   wherein the first leaky integrator output is gated according to the neuromorphic neuron output spike signal and the second leaky integrator output is gated according to the excitatory input spike signal, and wherein the STDP synapse is configured to adjust the excitatory spike signal according to the synaptic conductance using the weight signal.

4. The cortical neuromorphic network of claim 1, wherein the neuromorphic neuron comprises an integrate-and-fire neuromorphic neuron that comprises a excitatory input to receive the excitatory spike signal of the neuromorphic node that is weighted according to an STDP synaptic conductance of the STDP synapse, a second input to receive an inhibitory spike signal, and an output to provide the output spike signal of the neuromorphic node.

5. The cortical neuromorphic network of claim 1, wherein the neuromorphic node further comprises a synaptic memory associated with the STDP synapse, the synaptic memory to store a STDP synaptic conductance and a potentiation value of the STDP synapse, wherein the cortical neuromorphic network is configured to operate according to synaptic time multiplexing (STM).

6. The cortical neuromorphic network of claim 5, wherein the synaptic memory comprises a non-volatile memory and a volatile memory, the non-volatile memory to store the STDP synaptic conductance and the volatile memory to store the potentiation value at an end of an STM cycle.

7. The cortical neuromorphic network of claim 5, wherein the neuromorphic node further comprises a connection router to receive input spike signals including the excitatory spike signal at an input of the neuromorphic node and to route the received input spike signals to the STDP synapse and the neuromorphic neuron according to a synaptic routing map and during a predetermined time slot of a cycle of the STM.

8. The cortical neuromorphic network of claim 7, wherein the input spike signals further include an inhibitory spike signal produced by an inhibitory neuromorphic node, the inhibitory neuromorphic node being connected to receive the neuromorphic node output spike signals from one or more neuromorphic nodes of the network layer.

9. The cortical neuromorphic network of claim 1, further comprising an inhibitory neuromorphic node, the inhibitory neuromorphic node comprising:
   an STDP synapse to receive and to weight recurrent spike signals from the neuromorphic nodes of network layer;
   a neuromorphic neuron to receive the weighted recurrent spike signals from the STDP synapse; and
   an interneuron inhibition gain block to amplify an output spike signal of the neuromorphic neuron according to an inhibition gain to produce an inhibitory spike signal at an output of the inhibitory neuromorphic node.

10. The cortical neuromorphic network of claim 9, wherein the inhibitory spike signal from the inhibitory neuromorphic node is provided to an inhibitory input of the neuromorphic node, the cortical neuromorphic network implementing a cortical map.

11. A synaptic time multiplexing cortical neuromorphic system comprising:
   a plurality of neuromorphic nodes arranged as a network layer to receive excitatory spike signals, the excitatory spike signals representing a combination of recurrent spike signals and feedforward spike signals, the recurrent spike signals being derived from output spike signals produced by the neuromorphic nodes in the network layer, the feedforward spike signals representing output spike signals from a plurality of input neurons of an input layer, the neuromorphic nodes comprising a spike timing dependent plasticity (STDP) synapse, a neuromorphic neuron and a synaptic memory associated with STDP synapse,
   wherein the neuromorphic nodes are configured to operate according to a cycle and time slots of synaptic time multiplexing (STM).

12. The synaptic time multiplexing cortical neuromorphic system of claim 11, wherein the STDP synapse is configured to receive the excitatory spike signal of the neuromorphic node, to weight the excitatory spike signal according to an STDP synaptic conductance, and to provide the weighted excitatory spike signal to an excitatory input of the neuromorphic neuron, the neuromorphic neuron being an integrate-and-fire neuromorphic neuron, and wherein the synaptic memory is configured to update and store the STDP synaptic conductance and a potentiation value of the STDP synapse during the STM cycle.

13. The synaptic time multiplexing cortical neuromorphic system of claim 12, wherein the synaptic memory comprises a non-volatile memory and a volatile memory, the non-volatile memory to store the STDP synaptic conductance and the volatile memory to store the potentiation value at an end of the STM cycle.

14. The synaptic time multiplexing cortical neuromorphic system of claim 11, further comprising an inhibitory neuromorphic node to receive the recurrent spike signals from the neuromorphic nodes of the plurality and to provide an inhibitory spike signal to inhibitory inputs of the neuromorphic nodes, the synaptic time multiplexing cortical neuromorphic system to implement a cortical map.

15. The synaptic time multiplexing cortical neuromorphic system of claim 14, wherein the inhibitory neuromorphic node comprises:
   an STDP synapse to receive and to apply an STDP weight to the recurrent spike signals during a predetermined time slot of the STM cycle;
   a neuromorphic neuron to receive the weighted recurrent spike signals and to produce an output spike signal; and
   an interneuron inhibition gain block to amplify the output spike signal of the neuromorphic neuron according to an inhibition gain to produce the inhibitory spike signal.

16. The synaptic time multiplexing cortical neuromorphic system of claim 11, wherein the neuromorphic nodes further comprise a connection router to receive input spike signals including the excitatory spike signal at an input of the neuromorphic node and to route the received input spike signals to the STDP synapse and the neuromorphic neuron according to a synaptic routing map and during a predetermined time slot of the STM cycle.

17. A method of neuromorphic cortical operation, the method comprising:

receiving an excitatory spike signal using a neuromorphic node that comprises a spike timing dependent plasticity (STDP) synapse and a neuromorphic neuron, the neuromorphic node being a node of a plurality of neuromorphic nodes arranged as a network layer;

weighting the received excitatory spike signal according to an STDP synaptic conductance of the STDP synapse; and producing an output spike signal by processing the weighted excitatory spike signal using the neuromorphic neuron, the output spike signal being a recurrent spike signal of the neuromorphic node, wherein the excitatory spike signal comprises a combination of the recurrent spike signals from the neuromorphic nodes of the network layer and feedforward spike signals received from selected ones of a plurality of input neurons of an input layer.

18. The method of neuromorphic cortical operation of claim 17, the method further comprising:

receiving the recurrent spike signals with an inhibitory neuromorphic node; and producing an inhibitory spike signal from the received recurrent spike signals using the inhibitory neuromorphic node, the inhibitory spike signal being provided as an inhibitory input to the neuromorphic nodes of the network layer to implement a cortical map.

19. The method of neuromorphic cortical operation of claim 17, wherein the neuromorphic nodes are configured to receive the excitatory spike signal, to weight the received excitatory spike signal and to produce the output spike signal according to a cycle and time slots of synaptic time multiplexing (STM).

20. The method of neuromorphic cortical operation of claim 19, the method further comprising:

retrieving the STDP synaptic conductance and a potentiation value stored in a synaptic memory associated with the STDP synapse at a beginning of a predetermined time slot of the STM cycle to which the neuromorphic node is assigned, the synaptic memory comprising a non-volatile portion to store the STDP synaptic conductance and a volatile portion to store the potentiation value;

using the retrieved STDP synaptic conductance and potentiation value in weighting the received excitatory spike signal during the predetermined time slot; and updating the STDP synaptic conductance and the potentiation value at an end of the predetermined time slot, wherein the updated STDP synaptic conductance and potentiation value are stored in the synaptic memory and replace the previously stored STDP synaptic conductance and potentiation value.

21. The method of neuromorphic cortical operation of claim 19, the method further comprising routing input spike signals that include the excitatory spike signal at an input of the neuromorphic node to the STDP synapse and the neuromorphic neuron of the neuromorphic node according to a synaptic routing map and during a predetermined time slot of the STM cycle.

\* \* \* \* \*